United States Patent
Hall et al.

(10) Patent No.: US 12,280,420 B2
(45) Date of Patent: Apr. 22, 2025

(54) METHOD OF MAKING AN INORGANIC RETICULATED FOAM STRUCTURE

(71) Applicant: ERG Aerospace Corporation, Oakland, CA (US)

(72) Inventors: Mitchell Hall, Reno, NV (US); Mark Benson, Carmel, CA (US); Metodi Zlantinov, San Francisco, CA (US); Alex Parke, Sparks, NV (US); Denver Schaffarzick, Pacifica, CA (US)

(73) Assignee: ERG Aerospace Corporation, Oakland, CA (US)

( * ) Notice: Subject to any disclaimer, the term of this patent is extended or adjusted under 35 U.S.C. 154(b) by 0 days.

(21) Appl. No.: 18/249,710

(22) PCT Filed: Oct. 20, 2021

(86) PCT No.: PCT/US2021/055703
§ 371 (c)(1),
(2) Date: Apr. 19, 2023

(87) PCT Pub. No.: WO2022/087034
PCT Pub. Date: Apr. 28, 2022

(65) Prior Publication Data
US 2024/0001435 A1    Jan. 4, 2024

Related U.S. Application Data

(60) Provisional application No. 63/094,176, filed on Oct. 20, 2020.

(51) Int. Cl.
*B22C 7/02*    (2006.01)
*B22C 9/04*    (2006.01)
(Continued)

(52) U.S. Cl.
CPC ............ *B22C 7/02* (2013.01); *B22C 9/043* (2013.01); *B22D 25/005* (2013.01); *B33Y 10/00* (2014.12); *B33Y 40/20* (2020.01); *B33Y 50/00* (2014.12)

(58) Field of Classification Search
CPC .......... B22C 7/02; B22C 9/043; B22D 25/005
See application file for complete search history.

(56) References Cited

U.S. PATENT DOCUMENTS 3,946,039 A * 3/1976 Walz ................. B22C 9/043
                                                          264/44
5,762,125 A    6/1998 Mastrorio
(Continued)

FOREIGN PATENT DOCUMENTS

CN    109439949 A    3/2019
EP     3473350 A1    4/2019

OTHER PUBLICATIONS

Carneiro, V.H. et al, "Additive manufacturing assisted investment casting: A low-cost method to fabricate periodic metallic cellular lattices", Additive Manufacturing, (2020), vol. 33, pp. 1-12.
(Continued)

*Primary Examiner* — Kevin P Kerns
*Assistant Examiner* — Steven S Ha
(74) *Attorney, Agent, or Firm* — Gorman IP Law, APC; Susan W. Gorman

(57) ABSTRACT

A new method of manufacturing a dual investment reticulated solid mold for producing reticulated metal foam, that includes 3D printing of a wax or resin reticulated precursor prior to pre-investment with a pre-investment plaster or pre-investment ceramic plaster, and removal of the precursor before addition of liquid metal to generate reticulated metal foam.

34 Claims, 3 Drawing Sheets

(51) Int. Cl.
  *B22D 25/00* (2006.01)
  *B33Y 10/00* (2015.01)
  *B33Y 40/20* (2020.01)
  *B33Y 50/00* (2015.01)

(56) References Cited

U.S. PATENT DOCUMENTS

| | | |
|---|---|---|
| 9,162,279 B1 | 10/2015 | Pickens |
| 9,789,536 B2 | 10/2017 | Noraas et al. |
| 10,252,326 B2 | 4/2019 | Noraas et al. |
| 2018/0001561 A1 | 1/2018 | Hascher et al. |
| 2018/0036793 A1 | 2/2018 | Noraas et al. |
| 2020/0016441 A1* | 1/2020 | Pettey ................ A62C 3/06 |

OTHER PUBLICATIONS

Dani, I. et al, "Sustainability of industrial components using additive manufacturing and foam materials", Procedia Manufacturing, (2020), vol. 43, pp. 10-17.
Groeber, M.A. and Jackson, M.A., "DREAM.3D: A Digital Representation Environment for the Analysis of Microstructure in 3D", Integrating Materials and Manufacturing Innovation, (2014), vol. 3(5), pp. 1-17.
International Search Report—Feb. 3, 2022.
Written Opinion of International Searching Authority, Feb. 9, 2022.

* cited by examiner

METHOD OF MAKING AN INORGANIC RETICULATED FOAM STRUCTURE

This application is a National Phase Under 35 USC § 371 of PCT International Application No. PCT/US2021/055703 filed on Oct. 20, 2021, which claims priority under 35 U.S.C. § 119 on Patent Application No. 63/094,176 filed in the United States on Oct. 20, 2020, the entire contents of each of which are hereby incorporated by reference.

TECHNICAL FIELD

Embodiments of the present invention relate to the technical field of open cellular materials. More particularly, the embodiments of the present invention are directed to the process of manufacturing inorganic reticulated foam structures using a wax printed precursor.

BACKGROUND OF THE INVENTION

Form retaining reticulated structures of metal or the like have heretofore been produced by a number of different processes or techniques, and have a wide variety of utilitarian purposes. By way of example only, such structures may be used as light weight structural members, solid propellant reinforcement and burning rate modifiers, battery plates, fluid phase separators, electrochemical anodes and cathodes, heat shields, heat exchanger cores, fluid filters, sound or shock absorbers, anodic protectors, flame guards, liquid reservoirs, microwave reflectors, as well as in numerous other applications.

The methods of making an inorganic reticulated foam structure were first patented under USPTO 3,616,841 and assigned to Energy Research and Generation, Inc. That process can be summarized as taking a mass of conventional reticulated plastic foam (precursor); immersing the plastic foam precursor in molten wax to coat the ligaments of the reticulated plastic foam; allowing the wax to harden before removing excess wax so that a thin coating of wax remains on the ligaments of the reticulated plasticfoam; investing the wax-coated reticulated precursor with plaster of paris or a similar type of material; heating to remove excess water from the invested reticulated plastic foam; heating the invested reticulated plastic foam at temperature sufficient to volatilize the plastic foam, leaving a mold; pouring molten metal or other substance into the investment to fill all of the voids of the investment; cooling the metal; and removing the mold by washing or mechanical breaking to generatea reticulated metal foam material. All subsequent methods of making an inorganic reticulated foam structure are based on this method and provide differences by either introducing additional steps or by specifying particular ligament and/or pore ranges.

Foam material produced by these methods taught in the prior art possess a number of shortcomings and features that are disadvantageous.

One disadvantage is that the current process is limited to manufacturing reticulated structures that utilize plastic foams as the base precursor. This limits the ranges of the precursor pore sizes that can be used as the primary pore sizes of those available materials, which are typically 5 pores per inch (PPI), 10 PPI, 20 PPI, and 40 PPI. These size limitations are also non uniform and highly variable; that is, one part is different from the next where the pore size of 5PPI might actually have a range such as 3.5PPI to 7 PPI and inconsistent ranges in between. Therefore, the negative aspects of using a mass of conventional reticulated plastic foam as a precursor include limited ranges of porosity, having to use the same homogeneous porosity for a given part, and the variability of the porosity. Each of these decreases system optimization feasibility.

Another disadvantage of using a mass of conventional reticulated plastic foam precursor, such as polyurethane, is that the conventional plastics used as a substrate pattern have varying ligament arrangements, densities, and patterns. As an example, a conventional plastic foam reticulatedstructure might have rounded structure connections, linear structure connections, or a combination thereof when intersecting at a node. Therefore, the negative aspects of using a mass of conventionalreticulated plastic foam include structural variability where a given part has inconsistent ligament structural intersections. This creates variability and further reduces system optimization feasibility.

Another disadvantage of using the current plastic precursor is that the current process requires a mass of conventional reticulated plastic foam, such as polyurethane, which is used as a pattern for the finished foam metal. The use of plastic foams as a precursor requires procurement of these materials, cutting of the materials to be used within the casting process, and environmental challenges with melting and controlling the emissions of the plastic foams. Therefore, there are substantial environmental and labor intensive processes presented using conventional plastic foams as the precursor as a manufacturing material.

The primary environmental challenges that exist with the burning out of the polyurethane (or other burnable substrate) precursor is that the process is extremely detrimental to the environment. Often, air purification treatment processes, carbon bed filtration systems, and/or thermal oxidizers are required to minimize pollutants. The costs to operate and manage these treatment processes can be quite significant and governmental regulations are making these processes expensive with few alternatives for disposal of the resulting side products.

Yet another disadvantage of utilizing a plastic foam precursor as a substrate is that the plastic foam requires high temperature burn out to volatize and completely remove the plastic foam from the casting. These high temperatures are also held for extended periods of time and the process can take days. The negative impacts of running kilns at high temperatures for multi days/hours results in high energy costs and throughput challenges where parts are contained within the kilns for extended periods of time.

Still another disadvantage of using a plastic foam precursor is that such plastic foams are not ideal for manufacturing exotic material alloys, such as titanium. This is due to the fact that the material alloys chemically react with the residual carbon left within the mold after the burnout process.

Another disadvantage of the current precursors used include secondary machining processes that are required to machine the resulting reticulated foam metal into parts having the final desired configuration. These secondary procedures slow throughput and increase costs associated with machining and other fabrication processes.

Current use of a plastic foam substrate as a precursor also requires processing to create ligament densification. This is done through the use of the wax additive processes described in U.S. Pat. No. 3,616,841, such as wetting or wax immersion. As an example, a plastic foam without ligament densification may typically yield a density of 3-4%. However, wax can be added to the ligament structure to achieve densities greater that 4% and less than 35%. This process involves multiple solidification and wetting steps, high temperature cure ovens, and manpower or machinery to conduct the process. Therefore, the ligament densification step is time intensive, and requires significant amounts of labor and machinery to complete. It is also a source for quality problems as windows and other deformities can be introduced at this point in the process.

Finally, current manufacturing methods limit manufacturing capabilities to a single homogeneous structure. Parts are unable to have unique features, lack heterogeneous porosity and density that may otherwise provide system optimization, and are unable to be manufactured in combination with other solid materials. As an example, a reticulated foam structure manufactured using current precursor methods must be bonded, welded, or brazed to a solid structure or block of solid material.

BRIEF SUMMARY OF THE INVENTION

Therefore, there is a need to utilize a process to manufacture inorganic reticulated structures that is environmentally friendly, that decreases production costs, reduces structural variability, offers engineering optimization during the design phase, and which does not use a plastic based precursor as a part of the manufacturing process.

It is the objective of the present disclosure to enable the end user the ability to optimize a ligament and node structures of a precursor to enable optimized performance through computer modeling where densification is achieved using 3D printers verse wax densification/wetting processes. This process enables pores per inch (PPI) and structural consistency within a part, ensures quality parts are manufactured with decreased variability, and is replicable over time.

It is also the objective of the present disclosure to have repeatability and precision design with inorganic reticulated structures where the structure is not limited to plastic foam based precursors but uses printed wax or resin as the precursor.

It is also an objective of the present disclosure to alter the PPI and ligament density of the 3D wax or resin reticulated structure where the structure is not limited to the products available through polyurethane suppliers (typical sizes include 5, 10, 20, and 40 PPI). This is done by generating computer models and manipulating the models using computer aided drafting software to achieve porosities of precursors that range from 0.1 to 100 PPI. Furthermore, computer software may be used to design many different porosities within a single part. This heterogenous approach of changing the porosity enables precision design optimization for unique customer requirements.

It is the further objective of the present disclosure to use 3D printers to produce precursor patterns for investment casting process. Examples of printers capable of achieving these precursor reticulated structures include printers that utilize wax or castable resin materials such as the FORMLABS®, STRATASYS®, and other stereolithography of 3D printers. Examples of castable waxes and castable resins include those materials available through the manufacturers of the 3D printers while other suitable materials include those that do not produce hazardous byproducts and emissions.

It is a still a further objective of the present disclosure to utilize precursors that are generated using 3D printing technology to build products that meet the final dimensions required and which reduce the need to machine parts from bulk shapes using secondary processes. This will reduce the time and resources needed to machine parts to the final dimensions, reduce bulk material expenses, increase process throughput, and expedite quality control.

DETAILED DESCRIPTION

Figure 1:
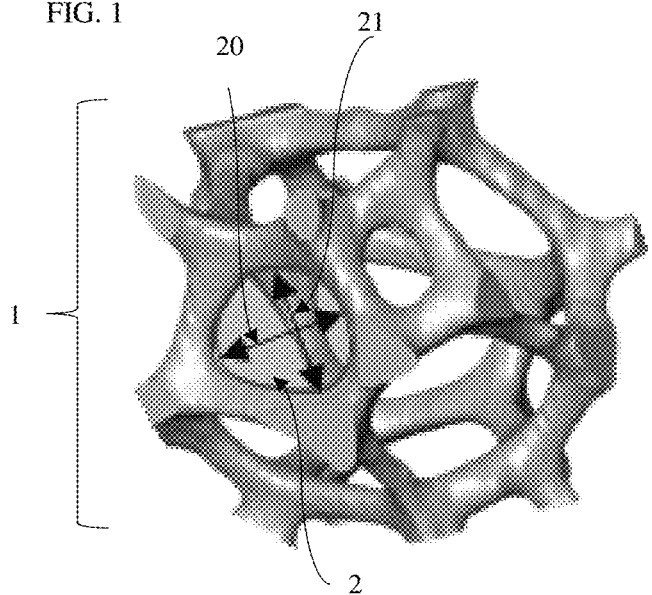
FIG. 1 illustrates the wax or resin precursor.

A new method of manufacturing reticulated metal foam via a dual investment solid mold according to one disclosed non-limiting aspect is presented. The reticulated metal foam is typically manufactured of aluminum, copper, titanium or other castable material. Other materials will also benefit here from.

To accomplish the manufacturing, a wax or resin precursor 1 model is first generated. The first step in this process is to select a piece of existing metal or plastic foam for use as the wax or resin precursor 1 model template. This foam sample has a targeted porosity and density. It is scanned using CT technology and an engineering model is generated. This wax or resin precursor 1 model template can then be altered using computer aided drafting software, 3D printed, and then used as a precursor for the investment casting process.

To accomplish the formation of a precursor model 1, a calibration phantom is attached to the metal foam before the sample is placed into a CT machine. The calibration phantom is a solid piece of metal or plastic, having the same composition as the metal or plastic foam, The metal foam and the calibration phantom are then scanned with a set of machine parameters (i.e. resolution, field of view, number of projections, x-ray beam conditions, etc.) which result in a high-quality CT scan. The raw output of the CT machine is then reassembled into a series of 2D image files. The image files are then imported into a software package (e.g. AVIZO®, VG Studio) designed to handle CT data or other 3D data. The software then assembles the 2D image stacks into a 3D volume.

The next step is to determine the boundary between the surface of the metal foam and air. This is known as thresholding the raw CT data. To properly threshold the data the calibration phantom is analyzed to determine the isosurface value that is accurate for the scan. This is done by applying a native image processing algorithm to the area of the scan that contains only the calibration phantom. The result of this algorithm is an isosurface value.

The isosurface is the gray scale value that defines the boundary between air and metal. Once determined this value is applied to the entire dataset. This is done by converting the value for each voxel or 3D pixel into value for air or for metal by comparing the raw value to the isosurface value. The result of this process is a new binarized dataset. This new dataset now only includes two values, one for air and one for metal. At this point there are two ways to proceed: by converting the current dataset into a 3D surface and printing the file as is or by further analyzing the data and modifying the open celled structure.

In order to modify the open celled structure, the first step is to further analyze the binary voxelized dataset to determine the coordinates for the center of each pore. This is done by first selecting the voxels that correspond to the air out of the binary voxelized dataset. Next the pore space needs to be separated into individual pores. This is done using a native algorithm in the software that separates volumes at the smallest points. The output of this algorithm is a new dataset that only includes voxels for each individual pore; that is, the voxels that were shared between pores have been left out. Next each pore volume is labeled to create an individual identity for each pore. This is done using a native algorithm in the software that labels each separate volume that was created from the previous separation step. Once this is complete, each pore is a separately labeled set of voxels, which then needs to be analyzed geometrically. This is done using a native algorithm in the software that calculates the volume, surface area, and coordinates for the centroid of each pore. The result of this algorithm is a set of statistics for each pore. The statistics can then be used immediately or exported into a text file for use in another software package.

Appropriate software packages include, but are not limited to, DREAM.3D (Groeber and Jackson (2014) Integrating Materials and Manufacturing Innovation 3:5), Python script. Such software uses the coordinates for each pore centroid as a seed point to build a Voronoi diagram. After the Voronoi diagram is built, the open-celled structure is created. This is done by calculating each voxel's distance to the nearest triple line (i.e. where three or more pore/cells meet) and quadruple point (i.e. where 4 or more pores/cells meet). Then the program evaluates which voxels will be included in the final dataset and which will be the open-celled network. Once this new structure is created it is exported from the software as an image stack for use in the original software package. Once the new image stack is imported into the first software package which handled the CT data or another software for analysis of CT and other types of 3D data, to convert a binarized dataset to a 3D surface. For this process the isosurface value does not need to be determined because the dataset is already binarized.

In order to convert the binarized dataset into a 3D surface, one first needs to select the voxels that correspond to the solid metal. This is done by thresholding the data; that is, selecting all the voxels above a certain value. The next step is to apply a surface generation algorithm from the software package to the thresholded data set. The output is a generic 3D surface dataset which is then saved in a file format compatible with a 3D printer. This dataset is also able to be generated utilizing mesh software when parts do not require recertification.

With a base wax or resin precursor 1 model generated, the engineer can adapt the wax or resin precursor 1 model to meet end user requirements. FIG. 1 illustrates the wax or resin precursor 1. Shown in the image are two variables for defining the reticulated structure and includes a pore 2 and individual ligament 3. The pore 2 size is shown and can be estimated by length 20 and height 21. The number of pores 2 and the size of the pores (length 20 and height 21) are controlled using engineering computer software when designing parts using the new wax or resin precursor 1. It should be noted that the old method of using a polyurethane substrate has limited sizes available based on availability from polyurethane manufacturers. Examples of sizes of pores 2 per inch provided by manufacturers usually includes 5, 10, 20, and 40 pores 2 per inch. The new approach allows an engineer to modify the PPI anywhere from 0.1 to 100 pores per inch (PPI) and to engineer a varying PPI value within the structure. Structural variability is also reduced where the PPI is made consistent across the wax or resin precursor 1.

Ligament 3 thickness is another important variable that can be modified using the new wax precursor 1 method. While the old method of using polyurethane substrates required extensive wetting processes and ligament 3 thickening procedures, the new process allows for ligament 3 thickness modification during the generation of the wax precursor 1 model. The range of ligament 3 densities of the new method can vary between 4% to 50% solid to air ratio and is easier to manufacture due to limited windows and other defects that occur during the wetting process using the old method. Old methods were limited to 4% to roughly 20% solid to air ratio. This limitation is mostly due to windows and ligament densification processes that close the open celled reticulated structure. Without these process limitations, densification is widely broadened using the new method.

The ability to control the number of pores 2 per inch and the ligament 3 density increases the number of applications where reticulated foams can be used. The new method of using wax or resin precursors 1 enables stronger materials to be used, systems to be further optimized, and broadens the number of applications where reticulated foams can be used to contribute to system solutions. While the number of pores 2 and ligament 3 density is highly versatile using the new wax precursors 1 approach, other engineering modifications can be made to the material using computer software. These other types of structural changes may include rounding the exteriors of the ligaments 3, adding chamfers, or other structural changes to further optimize design, case manufacturing, and decrease structural variability. None of these additional applications were available using a polyurethane substrate.

In addition, unlike using old techniques, the new technique of using a wax or resin precursor 1 enables a part to have different properties across a single part. As an example, a part can have a porosity of 50% solid to air ratio at one section and a 5% solid to air ratio at another section of the same part. This versatility, which is not possible using polyurethane substrates, enables optimized design capabilities leading to greater material performance at significant cost reductions.

Figure 3:
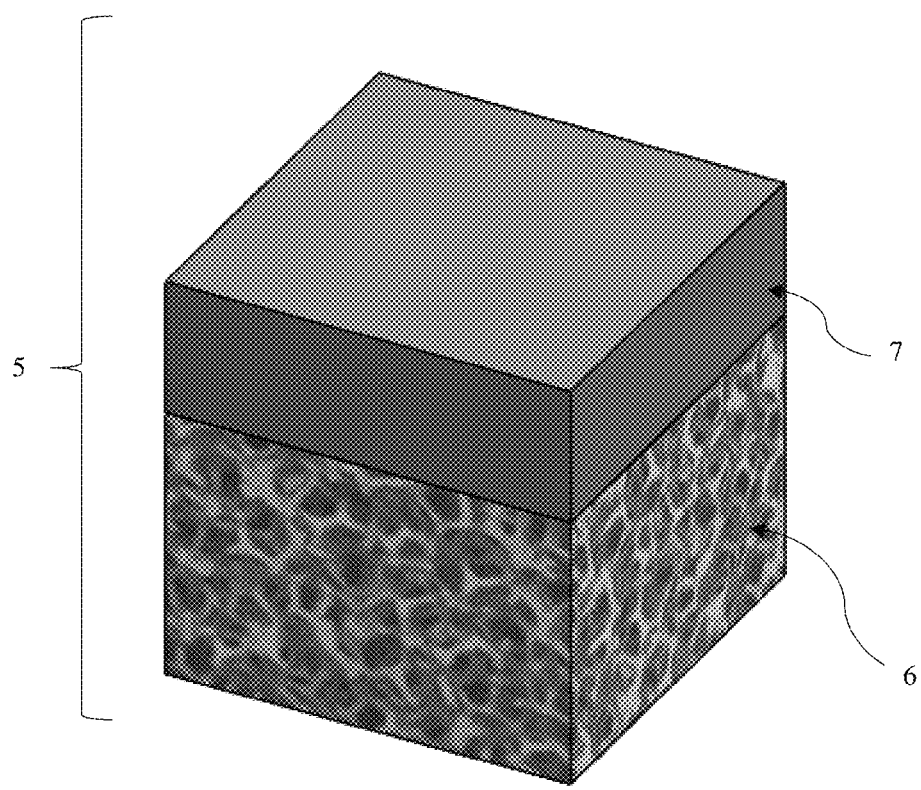
FIG. 3 illustrates an example of a complex precursor geometry.

Manipulation of the data file can also include variable material compositions. For the first time, complex precursor geometry 5 can be manufactured in a single casting process. Complex precursor geometry 5 includes parts that combine a reticulated foam precursor 6 with solid geometries. FIG. 3 illustrates an example of a complex precursor geometry 5. As shown, there exists a reticulated foam precursor 6 section that is attached to a solid plate structure 7. This approach results in a single part being casted that includes both a reticulated foam structure and a solid material. This new approach is ideal because it reduces bonding, welding, brazing, and other attachment techniques that would otherwise be required to connect the reticulated foam metal to a solid geometry after casting. Therefore, the new method reduces costs, time, and quality control requirements that would otherwise be required for joining and attaching two or more parts. It should be recognized that the solid plate structure 7 presented is a simple rectangular body. One familiar in the art should recognize that other geometries, such as cylinders, spheres, arcs, and partial geometries can also be included as a complex precursor geometry 5. Furthermore, the example illustrates a single solid body connected to a single reticulated foam structure. It should be recognized that the new process may include one or several solid bodies and/or one or several reticulated foam structures in combination with one another.

Figure 4:
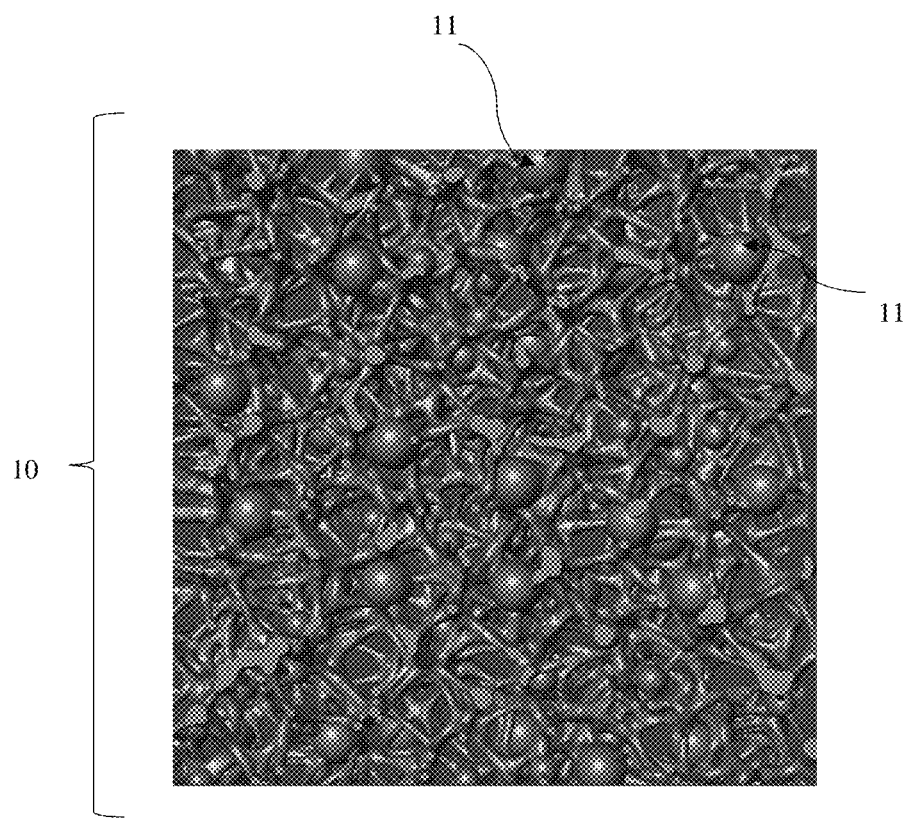
FIG. 4 illustrates an example of imbedding a wax or resin precursor with geometric shapes.

Manipulation of the data file can also include imbedding geometric shapes within the wax or resin precursor 1 structure during the design phase. FIG. 4 illustrates an example of imbedding a wax or resin precursor 1 with geometric shapes. The example illustrates a number of solid spherical bodies 11 imbedded within the reticulated structure 10. For the first time, these types of geometries can be embedded within the wax or resin precursor 1 and used to meet challenging engineering requirements. Examples of where these types of applications may be useful include acoustic dampening, vibration dampening, or explosive fragmentation warheads to name a few.

Upon completion of manipulating the new precursor data file, the data is then converted to a stl. file or similar file used by 3D printing systems. Examples of 3D printing systems that have been used include stereolithography printers that use castable waxes or castable resins. The part file is then shown as an image file to enable customizable printing options. Printing of the precursor is then initiated, and the time and amount of wax or resin used varies given the size of the part.

An enhanced wax or resin precursor structure 30 that resembles the wax or resin precursor 1 model or a wax or resin precursor structure identical to the wax precursor 1 model results upon the completion of printing. The enhanced structure 30 or structure identical to precursor 1 is free of polyurethane or other plastic based foam.

Figure 2:
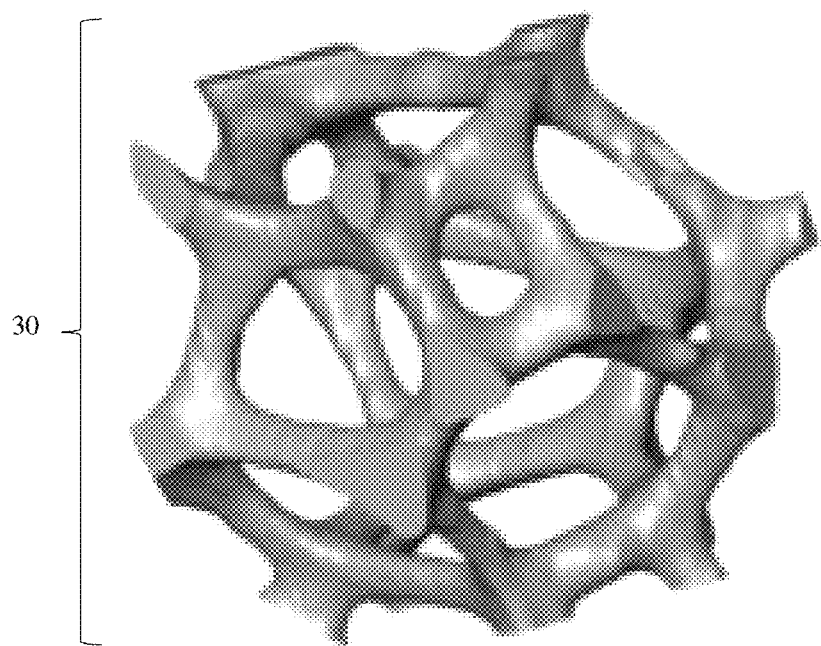
FIG. 2 shows a reticulated foam wax or resin enhanced structure.

The reticulated foam wax or resin enhanced 30 structure or structure identical to precursor 1 is now ready for investment with plaster or a ceramic plaster (see FIG. 2). These materials, such as ULTRA-VEST® must be settable and heat resistant material which can be subsequently removed by being dissolved or washed away by water or other liquids, or removed by mechanical forces. A casting flask or sleeve, preferably having sidewalls and an open bottom is placed on a vibrating table, with the pattern disposed therein and spaced from the sidewalls, the bottom and closed top, with the sprue at uppermost. The investment is poured into the sleeve completely around the pattern, and just below the upper open end of the sprue. The bottom of the sleeve is sealed to the table the latter is vibrated, and a vacuum is preferably pulled in the sleeve by connecting the top thereof to a vacuum source. The vacuum assists in removing air from all intersections of the pattern and ensures the investment material flowing therein. The vacuum and vibration is continued for about 1 minute, and then stopped. After the plaster or other investment material has set, the sleeve is removed from the table and the lower layer of plaster scraped away, exposing the pores or voids on the surface of the pattern removed from the sprue.

Without removing the investment from the sleeve or flask, the investment is permitted to set for about one-half to one hour, and this assembly is then placed in an oven or furnace at a temperature of about 250 degrees Fahrenheit for approximately 2 hours, depending on size, for the purpose of driving off the water. If the water is driven off too rapidly, steam is generated and pressure can build up within the investment, causing it to explode. In this connection, it will be recalled that the old method utilized ligaments that consisted of wax covered polyurethane ligaments. The wax from those ligaments would melt at relatively low temperature and provide partial passageways for steam to escape. The new method, which utilizes ligament structures comprised completely of wax or resin, especially when wax is used, enables the rapid establishment of passageways at low temperatures because polyurethane is not present within the structures. This results in a much faster process and decreases energy and manufacturing costs. Optionally, a second plaster or ceramic plaster is invested over the original plaster or ceramic plaster.

After the water elimination step, the temperature is increased to continue ceramic plaster solidification and the wax or resin is removed. Using the old process, these temperatures would be increased to 1,000 to 1,500 degrees Fahrenheit to vaporize the polyurethane substrates. The new method, which does not require polyurethane vaporization, maintains temperature profiles that are in line with manufacturer's wax melt out recommendations or resin manufacturer's removal recommendations and uses short (2-6 hour) temperature profiles held at 1,350 Fahrenheit and ramp cycles. The old method required temperature profiles to be maintained at 1,000 to 1,500 degrees Fahrenheit for 18-36 hours depending on the size of the parts. This reduction of temperature and for shorter periods of time results in energy and costs savings. It also reduces toxic off gases that are associated with polyurethane vaporization. In other words, removing the polyurethane from the template makes this step of the process cheaper, faster, and greener.

The flask and investment can also be purified during this step. Examples of purification include the use of argon to infiltrate and wash the internal voids of the investment.

The flask and investment may then be removed from the furnace and placed on a chill plate and molten metal or other substance is poured through the sprue into the investment. Water is sprayed on the outer walls of the flask and on the chill plate to help in cooling, and as the molten metal hits the chill plate, it first solidifies along the bottom, and the water cooling tends to likewise first solidify the metal from the sides inwardly. Cooling can be further controlled by applying heat in order to keep the sprue molten until the remainder of the casting has solidified. Such heating methods include electric resistance heating and torches. Other cooling techniques, such as an air spray, could likewise be used. To assist in the flow of the molten substance through the investment, a pressure differential may be created by applying the air or other gar pressure to the upper surface thereof. Conversely, the chill plate may be provided with apertures and connected to a vacuum source. Where a gas is used, an inert gas possesses certain advantages. It will also be understood, however, that mechanical means, such as vibrations may be provided to assist in proper flow through the investment. The use of inert gas or vacuum increases the physical properties of the material by eliminating adverse chemical reactions and minimizing gas absorption of the material respectively.

When all of the voids of the investment are filled, the substance will cool and solidify in an integral from retaining continuous mass of ligaments having a fine grain system which is gas free and of low porosity. Upon such solidification, the casting is cooled, such as by quenching the same in water. The investment is then removed from the newly formed foam structure which possesses the same configuration as the original or enhanced precursor pattern. The removal or freeing of the structure from the mold may be performed in any conventional manner, i.e., washing, dissolving, air pressure, mechanical separation, or any combination thereof.

It should be understood that the foregoing description is merely illustrative of the process employed, since it will be apparent that in most of the separate steps of the process, other and usually conventional steps ay be substituted for those described herein.

The system leads itself to an extremely wide range of metals such as aluminum, lithium, copper, zinc, lead, nickel, iron, silver, sulfur, magnesium, uranium, etc., metal alloys, ceramics, and cermets, and in all instances, the finished foam material will be characterized in having ligaments which are continuous, gas free, or low porosity and of integral construction.

List of numerical identifiers
1 precursor model
2 pore
3 ligament
5 Complex precursor geometries
6 reticulated foam precursor
7 solid plate structure
10 complex precursor
11 spherical body
20 pore length
21 pore height
30 enhanced precursor

What is claimed is:

1. A method of manufacturing a reticulated plaster mold or a reticulated ceramic plaster mold comprising
   (a) selecting dimensions for preparation of a reticulated precursor, wherein the dimensions are selected from a library produced by the method comprising
      (i) obtaining at least one piece of existing reticulated foam metal;
      (ii) obtaining at least one piece of solid metal of the same composition as the reticulated foam metal of step (i);
      (iii) attaching the at least one piece of reticulated foam metal of step (i) to the at least one piece of solid metal of step (ii) to form a sample;
      (iv) performing a CT scan of the sample to generate a CT scan output;
      (v) reassembling the output of step (iv) into at least one 2D image file;
      (vi) generating an isosurface value;
      (vii) using the isosurface value to convert the at least one image file into a 3D surface file;
      (viii) optionally modifying the 3D surface file to alter the pore size and/or ligament density; and
      (ix) generating at least one generic 3D surface dataset that provides the dimensions for the precursor;
   (b) optionally altering ligament thickness;
   (c) optionally altering porosity;
   (d) 3D printing the reticulated precursor based upon the dimensions of at least one of steps (a)-(c);
   (e) pre-investing the precursor with a pre-investment plaster or pre-investment ceramic plaster to encapsulate the precursor;
   and
   (f) removing the precursor to produce a reticulated plaster or a reticulated ceramic plaster mold.

2. The method according to claim 1, wherein the ceramic plaster is invested over the pre-investment ceramic plaster.

3. The method according to claim 2, wherein the ceramic plaster is more rigid than the pre-investment ceramic plaster.

4. The method according to claim 1, wherein the ligament thickness of the precursor ranges from 5% to 50% material to air precursor ratio.

5. The method according to claim 1, wherein the precursor is in the form of a reticulated foam.

6. The method according to claim 1, wherein the precursor ligament thickness provides about a 4% to 50% material precursor to air ratio.

7. The method according to claim 1, wherein the precursor is generated with a compound selected from wax, a nontoxic resin, or a resin which does not produce hazardous byproducts or emissions.

8. The method according claim 1, wherein the precursor porosity and the ligament thickness are a repeatable uniform structure.

9. The method according to claim 1, wherein the dimensions of the reticulated precursor are selected from a library comprising various pore sizes and ligament densities.

10. The method according to claim 1, wherein the precursor further comprises embedded objects and/or ligament connections that are identical in form.

11. The method according to claim 1, wherein the precursor is heterogeneous in design.

12. The method according to claim 11, wherein the ligament thickness varies for a single part from 95% air to 50% air to precursor ratio.

13. The method according to claim 1, wherein the precursor is homogeneous in design.

14. The method according to claim 13, wherein the ligament thickness varies for a single part from 95% air to 50% air to precursor ratio.

15. The method according to claim 1, wherein the precursor further comprises a solid structure.

16. The method according to claim 1, wherein the precursor further comprises at least one solid structure integrated into the reticulated precursor.

17. A method of manufacturing reticulated metal foam via an investment solid mold comprising
   (a) pouring metal into the ceramic mold generated according to claim 1; and
   (b) removing the ceramic mold to produce the reticulated metal foam.

18. The method according to claim 17, wherein the metal is selected from the group comprising aluminum, lithium, copper, zinc, lead, nickel, iron, silver, sulfur, magnesium, uranium, metal alloys, ceramics, and cermets.

19. A method of manufacturing a dual investment mold comprising
   (a) selecting dimensions for preparation of a reticulated precursor, wherein the dimensions are selected from a library produced by the method comprising
      (i) obtaining at least one piece of existing reticulated foam metal;
      (ii) obtaining at least one piece of solid metal of the same composition as the reticulated foam metal of step (i);
      (iii) attaching the at least one piece of reticulated foam metal of step (i) to the at least one piece of solid metal of step (ii) to form a sample;
      (iv) performing a CT scan of the sample to generate a CT scan output;
      (v) reassembling the output of step (iv) into at least one 2D image file;
      (vi) generating an isosurface value;
      (vii) using the isosurface value to convert the at least one image file into a 3D surface file;
      (viii) optionally modifying the 3D surface file to alter the pore size and/or ligament density; and
      (ix) generating at least one generic 3D surface dataset that provides the dimensions for the precursor;
   (b) optionally altering ligament thickness;
   (c) optionally altering porosity;
   (d) 3D printing the reticulated precursor based upon the dimensions of at least one of steps (a)-(c);
   (e) pre-investing the precursor with a pre-investment plaster or pre-investment ceramic plaster to encapsulate the precursor;
   (f) investing the encapsulated precursor of step (e) with a second plaster or ceramic plaster; and (g) removing the precursor to obtain a dual investment reticulated plaster solid mold or a dual investment reticulated ceramic plaster solid mold.

20. The method according to claim 19, wherein the ceramic plaster is invested over the pre-investment ceramic plaster.

21. The method according to claim 20, wherein the ceramic plaster is more rigid than the pre-investment ceramic plaster.

22. The method according to claim 19, wherein the ligament thickness of the precursor ranges from 5% to 50% material to air precursor ratio.

23. The method according to claim 19, wherein the precursor is in the form of a reticulated foam.

24. The method according to claim 19, wherein the precursor ligament thickness provides about a 4% to 50% material precursor to air ratio.

25. The method according to claim 19, wherein the precursor is generated with a compound selected from wax, a nontoxic resin, or a resin which does not produce hazardous byproducts or emissions.

26. The method according claim 19, wherein the precursor porosity and the ligament thickness are a repeatable uniform structure.

27. The method according to claim 19, wherein the dimensions of the reticulated precursor are selected from a library comprising various pore sizes and ligament densities.

28. The method according to claim 19, wherein the precursor further comprises embedded objects and/or ligament connections that are identical in form.

29. The method according to claim 19, wherein the precursor is heterogeneous in design.

30. The method according to claim 19, wherein the precursor is homogeneous in design.

31. The method according to claim 19, wherein the precursor further comprises a solid structure.

32. The method according to claim 19, wherein the precursor further comprises at least one solid structure integrated into the reticulated precursor.

33. A method of manufacturing reticulated metal foam via a dual investment solid mold comprising
   (a) pouring metal into the ceramic mold generated according to claim 19; and
   (b) removing the ceramic mold to produce the reticulated metal foam.

34. The method according to claim 33, wherein the metal is selected from the group comprising aluminum, lithium, copper, zinc, lead, nickel, iron, silver, sulfur, magnesium, uranium, metal alloys, ceramics, and cermets.

* * * * *